(12) United States Patent
Ochiishi

(10) Patent No.: US 10,300,604 B2
(45) Date of Patent: May 28, 2019

(54) GRIPPING APPARATUS INCLUDING PROTECTIVE MEMBER FOR PROTECTING OBJECT AND ROBOT APPARATUS INCLUDING THE GRIPPING APPARATUS

(71) Applicant: FANUC CORPORATION, Yamanashi (JP)

(72) Inventor: Yoshinori Ochiishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 124 days.

(21) Appl. No.: 15/140,431

(22) Filed: Apr. 27, 2016

(65) Prior Publication Data

US 2016/0339588 A1 Nov. 24, 2016

(30) Foreign Application Priority Data

May 20, 2015 (JP) .................................. 2015-103053

(51) Int. Cl.
| | |
|---|---|
| B25J 13/08 | (2006.01) |
| B25J 9/16 | (2006.01) |
| B25J 15/00 | (2006.01) |
| B25J 19/00 | (2006.01) |

(52) U.S. Cl.
CPC ............. *B25J 9/1694* (2013.01); *B25J 15/00* (2013.01); *B25J 19/0075* (2013.01); *B25J 9/1612* (2013.01); *B25J 9/1674* (2013.01); *G05B 2219/37413* (2013.01)

(58) Field of Classification Search
CPC .... B25J 9/1694; B25J 19/0075; B25J 9/1674; B25J 15/00
See application file for complete search history.

(56) References Cited

U.S. PATENT DOCUMENTS

| | | | |
|---|---|---|---|
| 2005/0056441 A1* | 3/2005 | Rider ............... | H01L 21/67353 174/387 |
| 2006/0159215 A1* | 7/2006 | Kim ...................... | G21C 17/00 376/245 |
| 2010/0261595 A1* | 10/2010 | Schaefer ................. | B04B 7/08 494/20 |

FOREIGN PATENT DOCUMENTS

| | | |
|---|---|---|
| CN | 201824357 U | 5/2011 |
| CN | 103692432 A | 4/2014 |
| JP | 57-144688 A | 9/1982 |
| JP | 57144688 * | 9/1982 |
| JP | 03-109753 U | 11/1991 |
| JP | 5-60788 U | 8/1993 |
| JP | 11-058284 A | 3/1999 |
| JP | 3185718 U | 8/2013 |
| JP | 2014-237194 A | 12/2014 |
| JP | 2015-044267 A | 3/2015 |

\* cited by examiner

*Primary Examiner* — Michael S Lowe
(74) *Attorney, Agent, or Firm* — Hauptman Ham, LLP

(57) ABSTRACT

A gripping apparatus is configured to grip an object by a claw. The gripping apparatus includes an electric circuit passing through a first claw body, the object, and a second claw body, and a conduction judgment part for judging as to whether or not the electric circuit is electrically conductive. The electric circuit is shut off by a protective member, which protects the object, but becomes electrically conductive when the claw bodies and the object are in direct contact with each other.

12 Claims, 6 Drawing Sheets

GRIPPING APPARATUS INCLUDING PROTECTIVE MEMBER FOR PROTECTING OBJECT AND ROBOT APPARATUS INCLUDING THE GRIPPING APPARATUS

RELATED APPLICATIONS

The present application claims priority to Japanese Patent Application Number 2015-103053 filed May 20, 2015, the disclosure of which is hereby incorporated by reference herein in its entirety.

BACKGROUND ART

1. Technical Field

The present invention relates to a gripping apparatus for gripping an object and to a robot apparatus which includes the gripping apparatus.

2. Description of the Related Art

A gripping apparatus configured to grip an object is used to move the object from a certain position to another. For example, a gripping apparatus configured to hold an object between claws is known. However, when an object is directly gripped by claws, a surface of the object may be damaged during a gripping or conveyance process due to gripping force applied by the claws. In order to prevent it, a gripping apparatus having a protective member attached to claws has been used.

For example, JP H05-060788 U discloses a robot hand structure for gripping a workpiece by a pair of claws facing each other, in which the claws are provided with an elastic member on surfaces of the claws on which the workpiece is gripped. The elastic member is provided in order to ensure that the workpiece is gripped with smaller gripping force by increased friction between the claws and the workpiece, and to prevent the workpiece from being deformed and damaged.

As gripping and conveyance processes are repeatedly performed, the protective member may be worn out, or impaired due to coolant used in a machine tool or the like. As a result, the protection of the object may become insufficient, posing a risk of the claws of the gripping apparatus coming in direct contact with the object, thereby damaging the object.

A protective member of an existing gripping apparatus is subject to scheduled inspection, so as to be repaired or exchanged as necessary. In such a case, malfunction of the protective member can be discovered only at the time of the scheduled inspection. This raises a risk of damaging the objective since the gripping apparatus continues to be used until the next inspection even after the protective member no longer functions properly.

Therefore, there is a need for a gripping apparatus which facilitates inspection of the condition of a protective member which protects an object.

SUMMARY OF THE INVENTION

According to a first aspect of the invention, there is provided a gripping apparatus comprising: a claw configured to releasably grip an object; and a protective member configured to protect the object, the protective member being attached to the claw, such that when the object is gripped by the claw, the protective member is provided between the claw and the object, wherein the protective member has electrical insulation properties, wherein the gripping apparatus further comprises: an electric circuit configured to pass through the claw and the object when the object is gripped by the claw; and a conduction judgment part configured to judge as to whether or not the electric circuit is electrically conductive, and wherein the electric circuit is configured to become electrically conductive when the claw and the object are in direct contact with each other.

According to a second aspect of the invention, there is provided a gripping apparatus according to the first aspect, wherein the electric circuit also passes through a support on which the object is mounted.

According to a third aspect of the invention, there is provided a gripping apparatus according to the second aspect, wherein the object is a processed article processed by a machine tool, and wherein the support is a table of the machine tool, on which the processed object is mounted.

According to a fourth aspect of the invention, there is provided a robot apparatus comprising: a multiple-joint robot; and the gripping apparatus according to any one of claims 1 to 3, the gripping apparatus being attached to an arm of the multiple-joint robot.

According to a fifth aspect of the invention, there is provided a robot apparatus according to the fourth aspect, wherein a control apparatus configured to control the multiple-joint robot comprises the conduction judgment part.

These and other objects, features and advantages of the present invention will become more apparent in light of the detailed description of exemplary embodiments thereof as illustrated in the drawings.

DETAILED DESCRIPTION

Embodiments of the present invention will be described below with reference to the accompanying drawings. Constituent elements of the illustrated embodiments may be modified in size in relation to one another for better understanding of the present invention. The same or corresponding constituent elements are designated with the same referential sign.

Figure 1:
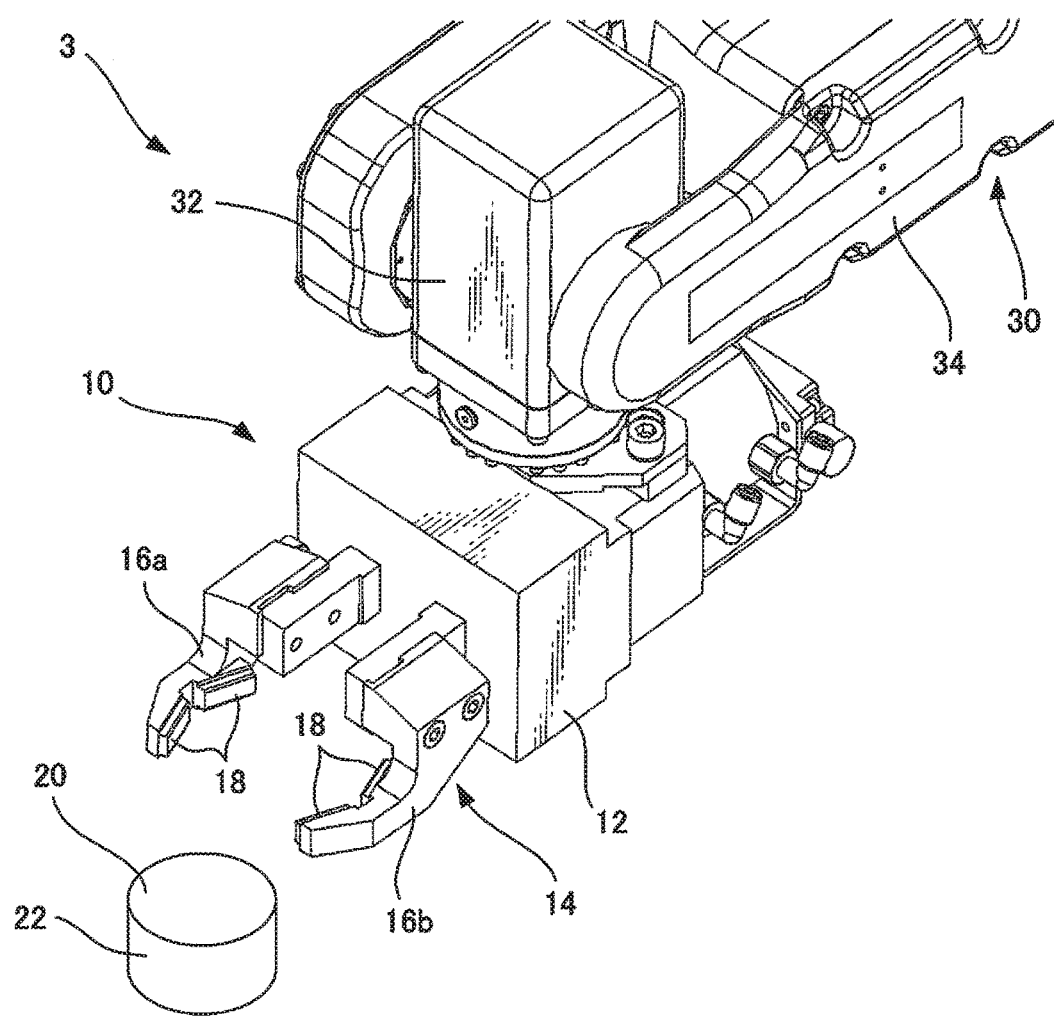
FIG. 1 is a perspective view illustrating a robot apparatus including a gripping apparatus according to one embodiment.

FIG. 1 is a perspective view illustrating a robot apparatus 3 including a gripping apparatus 10 according to one embodiment. A robot apparatus 3 includes a gripping apparatus 10 and a robot 30. The gripping apparatus 10 includes a base 12 attached to a wrist 32 of the robot 30, and a claw 14 which extends out of the base 12 and is configured to releasably grip an object 20. The gripping apparatus 10 is used to grip the object 20 and convey it from one place to another.

The robot 30 is a multiple-joint robot controllable so as to have a desired position and posture. In FIG. 1, only a part of the robot 30 is illustrated. Specifically, a part of an arm 34 on the tip end side and the wrist 32 attached to the tip end of the arm 34 are illustrated. The robot 30 includes a plurality of joint axes which are controlled by a robot control apparatus. The robot 30 is configured to move the wrist 32 to a desired position in response to an operation command output from the robot control apparatus.

The base 12 of the gripping apparatus 10 is screwed to the wrist 32 of the robot 30 and moves together with the wrist 32. In this way, the gripping apparatus 10 can be positioned at a desired position so as to grip the object 20 or convey the object 20 to a certain position.

The claw 14 of the gripping apparatus 10 includes a pair of claw bodies 16a and 16b which can move closer to or away from each other. The claw bodies 16a and 16b are operable independently of the robot 30 by way of a known power transmission mechanism, such as a rack and pinion or a ball screw. The claw bodies 16a and 16b are made of an electrically conductive material, such as metal or metal alloy.

The object 20 is made of an electrically conductive material. The shape of the object 20 is not limited to a cylindrical shape as illustrated. In other words, the gripping apparatus 10 can be used for an object of any shape, as long as the shape of the object is suitable so as to be gripped by the gripping apparatus 10. For example, an object having a polygonal column shape may also be used. According to one embodiment, the object 20 may be a processed article shaped by machining, but not limited thereto.

The gripping apparatus 10 operates to bring the claw bodies 16a and 16b into contact with a circumferential surface 22 of the object 20, and apply pressing force against the object 20 from substantially opposite directions, thereby gripping the object 20. The gripping apparatus 10 having the pair of claw bodies 16a and 16b will be described below by way of example, but the gripping apparatus may also be configured to grip an object by using three or more of claw bodies.

The claw bodies 16a and 16b are provided with protective members 18 on surfaces of the claw bodies 16a and 16b facing each other. The protective members 18 are interposed between the claw bodies 16a and 16b and the object 20, when the object 20 is gripped by the claw 14.

The protective member 18 reduces gripping force applied to the object 20 to protect the object 20 from being damaged. According to one embodiment, the protective member 18 may be made of a material which can easily deform, such as rubber.

Since the protective member 18 is easily deformable in accordance with the shape of the object 20, the surface area over which the protective member 18 is in contact with the object 20 is increased. Therefore, the stable gripping action is realized, allowing the object 20 to be gripped with relatively small force.

In the present embodiment, the protective member 18 has electrical insulation properties so as to shut off an electric circuit, which will be described below. Specifically, the protective member 18 is made of a material having an electrical resistance significantly greater than those of the claw bodies 16a and 16b and the object 20.

Figure 2A:
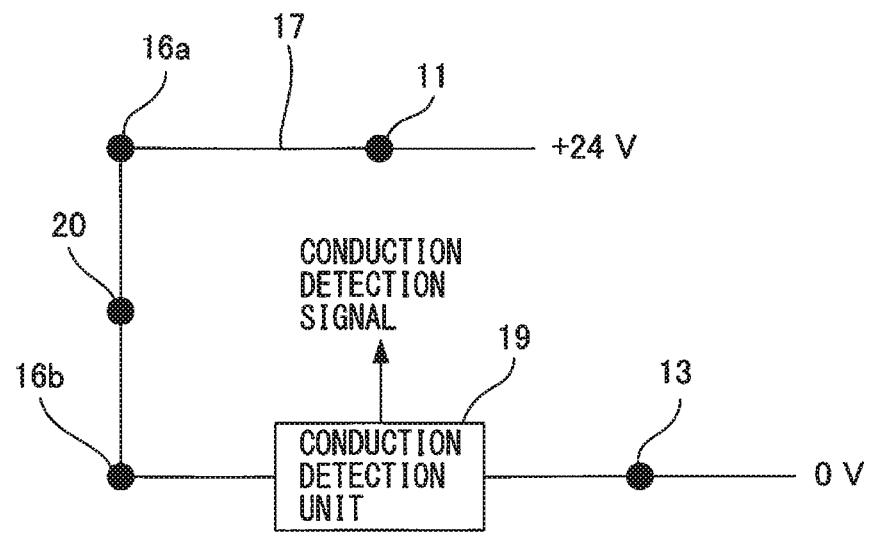
FIG. 2A shows an electric circuit passing through a claw and an object.

FIG. 2A shows an electric circuit 17 passing through the claw bodies 16a and 16b and the object 20. As illustrated, one of the claw bodies (hereinafter, may be referred to as "the first claw body 16a" for convenience) is connected to a first contact 11 which is connected to a power source, which is not shown in the drawings.

The power source is incorporated into the claw 14 or the base 12 or externally provided in relation to the gripping apparatus 10, so as to apply a certain voltage (e.g., 24 V) to the first contact 11 and therefore the first claw body 16a.

The other of the claw bodies (hereinafter may be referred to as "the second claw body 16b" for convenience) is connected to a second contact 13, to which a reference voltage (e.g., 0 V) lower than the voltage applied from the power source to the first claw body 16a is applied. The second contact 13 may also be grounded.

In this way, the gripping apparatus 10 is configured such that a potential difference is established between the first claw body 16a and the second claw body 16b, as necessary.

In order to prevent a short circuit between the claw bodies 16a and 16b at the end of the base 12, the claw bodies 16a and 16b are insulated from each other on the side of the base 12. For example, the base 12 may be electrically insulated from the claw bodies 16a and 16b, or an insulating element may be provided in the base 12, so as to insulate the claw bodies 16a and 16b from each other.

In the present embodiment, the object 20 has electrically conductive properties. Therefore, the gripping apparatus 10 is configured such that when the claw bodies 16a and 16b directly grip the object 20, the electric circuit 16 passing through the first claw body 16a, the object 20 and the second claw body 16b becomes electrically conductive.

Figure 2B:
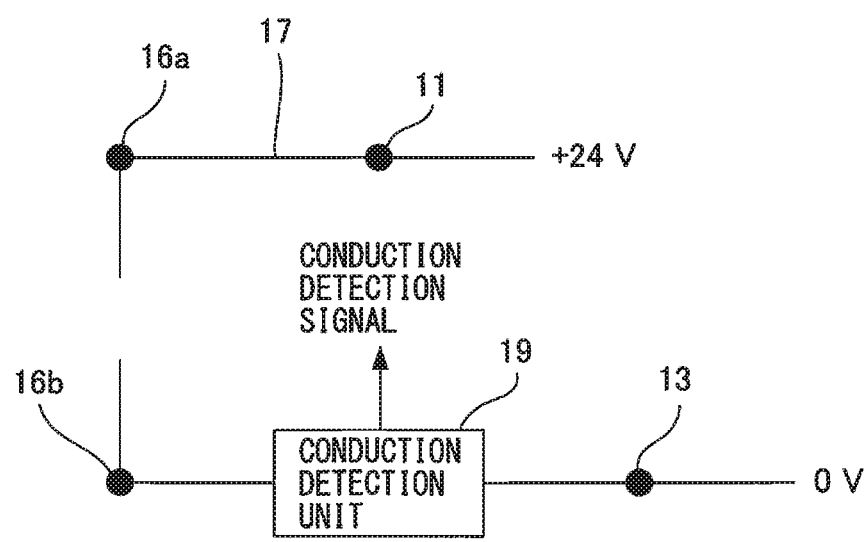
FIG. 2B shows the electric circuit shown in FIG. 2A being shut off by a protective member.

However, in this case, the protective member 18 having electrical insulation properties is provided to the claw bodies 16a and 16b, respectively. When the protective member 18 provides protection as intended, the claw bodies 16a and 16b and the object 20 are electrically insulated from each other by the protective member 18. Thus, as shown in FIG. 2B, the electrical circuit 17 is shut off by the protective member 18.

However, as the gripping apparatus 10 is used, the protective member 18 may be impaired and stop functioning properly, and as a result, the claw bodies 16a and 16b may be in direct contact with the object 20. In such a case, as described above with reference to FIG. 2A, the electric circuit 17 passing through the object 20 becomes electrically conductive, such that electric current flows through the first claw body 16a, the object 20, and the second claw body 16b.

The gripping apparatus 10 includes a conduction detection unit 19 as illustrated. The conduction detection 19 is configured from a current detector or a voltage detector having a known configuration. The conduction detection unit 19 includes, for example, a comparator, and is adapted to detect changes in voltage, which results from the electric current flow. The conduction detection unit 19 is adapted to output a conduction detection signal when the electric circuit 17 becomes electrically conductive.

Figure 3:
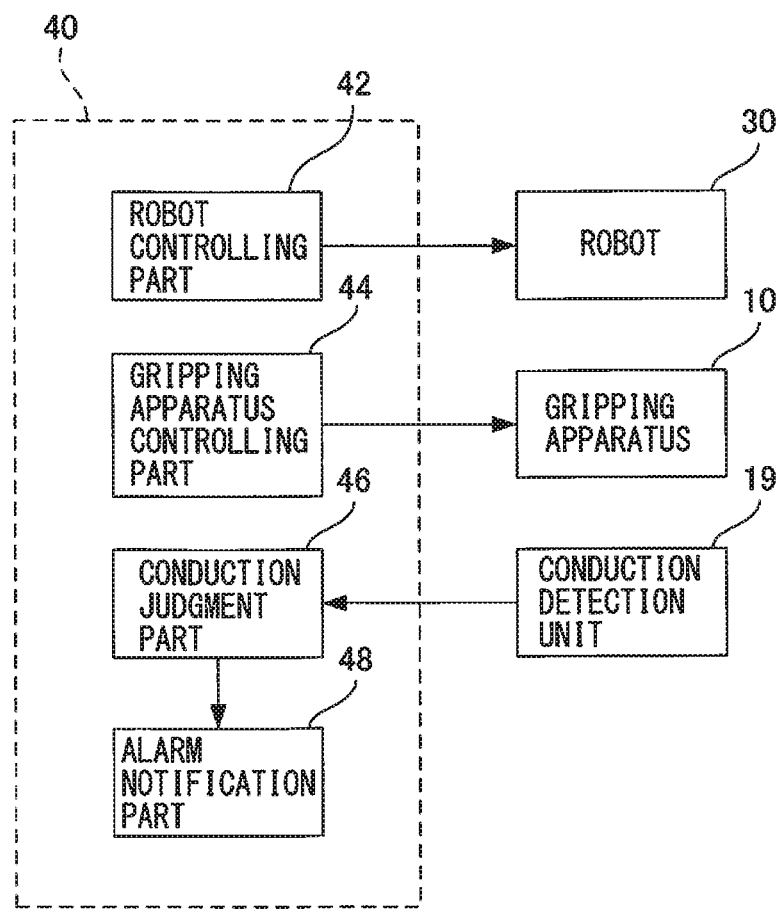
FIG. 3 is a functional block diagram of a robot control apparatus.

According to one embodiment, a conduction detection signal output from the conduction detection unit 19 is input to a robot control apparatus 40 which controls the robot 30. FIG. 3 is a functional block diagram of the robot control apparatus 40. The robot control apparatus 40 includes a robot controlling part 42, a gripping apparatus controlling part 44, a conduction judgment part 46, and an alarm notification part 48.

The robot controlling part 42 provides an operation command to motors which drive the joint axes of the robot 30. The robot 30 operates, in response to the operation command provided by the robot controlling part 42, to move the gripping apparatus 10 to a certain position.

For example, the robot controlling part 42 generates an approach operation command during a gripping process, in order to position the gripping apparatus 10 at a position where the object 20 can be gripped. During a conveyance process, the robot controlling part 42 generates a conveyance operation command, in order to position the gripping apparatus 10 at a target position where the object 20 should be released.

The gripping apparatus controlling part 44 provided an operation command to motors which drive the claw bodies 16a and 16b of the gripping apparatus 10. The gripping apparatus 10 operates, in response to the operation command provided by the gripping apparatus controlling part 44, to open and close the claw bodies 16a and 16b, whereby the object 20 is gripped or released.

The conduction judgment part 46 applies a voltage to the first claw body 16a through the above-described power source, and judges as to whether or not the electric circuit 17 is electrically conductive. The conduction judgment is performed in accordance with a signal output from the conduction detection unit 19. When a conduction detection signal is received from the conduction detection unit 19, the conduction judgment part 46 judges that the electric circuit 17 is electrically conductive.

The alarm notification part 48 issues an alarm when the conduction judgment part 46 judges that the electric circuit 17 is electrically conductive. The alarm may be displayed on a display apparatus connected to the robot control apparatus 40, or issued in other manners that an operator can perceive, for example, through alarm sound. In addition to the alarm notification, the robot 30 may be automatically stopped when it is judged that the electric circuit 17 is electrically conductive.

According to another embodiment, functions of the gripping apparatus controlling part 44 and/or the conduction judgment part 46 may be performed by a control apparatus separate from the robot control apparatus 40.

Figure 4:
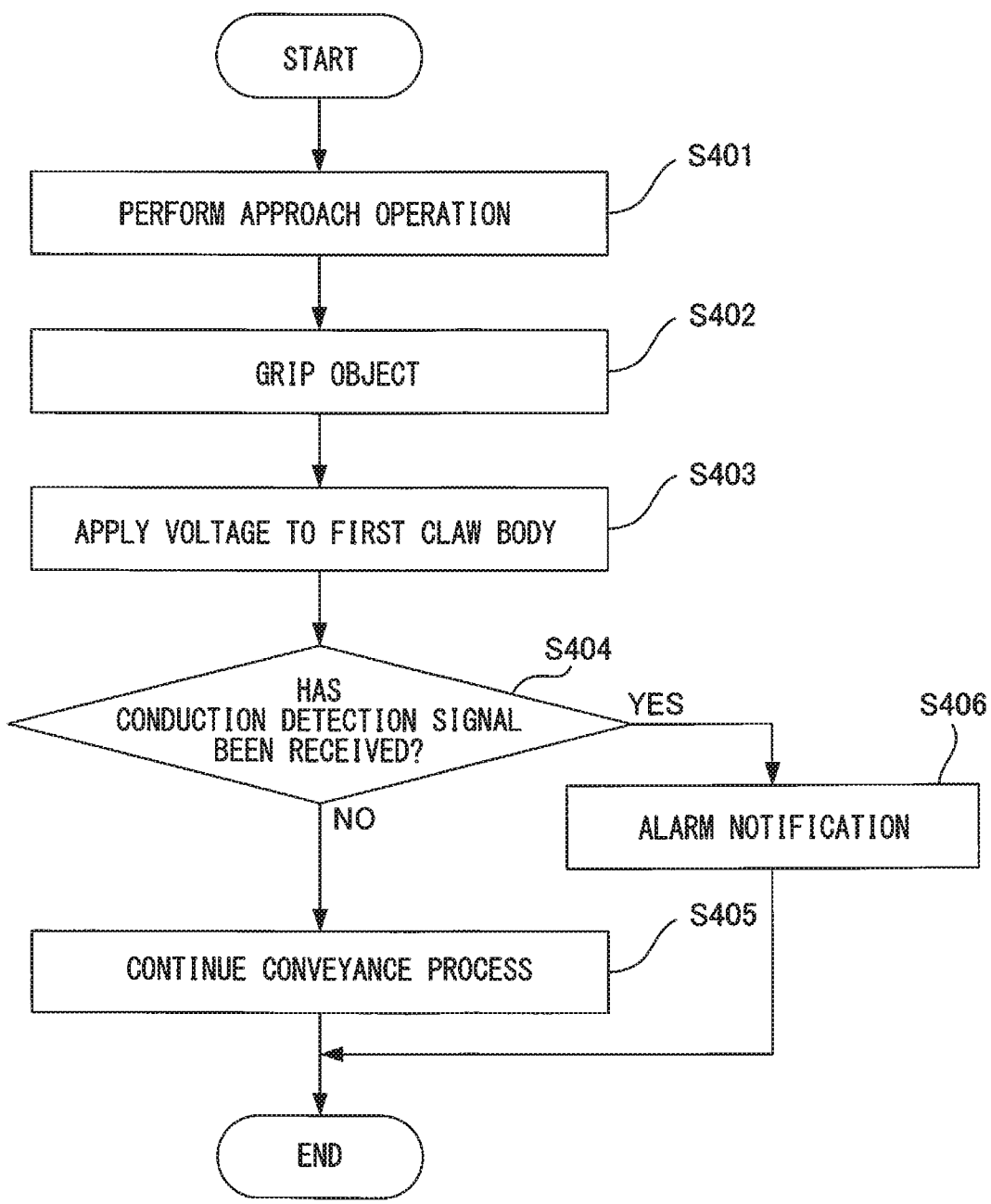
FIG. 4 is a flow chart illustrating a conveyance process of an object performed by using a gripping apparatus.

FIG. 4 is a flow chart illustrating a conveyance process of the object 20 performed by using the gripping apparatus 10 according to the present embodiment. At step S401, the robot 30 performs an approach operation in accordance with an operation command output from the robot controlling part 42. As a result, the gripping apparatus 10 is positioned at a position where the object 20 can be gripped.

At step S402, the claw bodies 16a and 16b of the gripping apparatus 10 are moved in a closing direction in accordance with an operation command output from the gripping apparatus controlling part 44, in order to grip the object 20.

At step S403, the conduction judgment part 46 applies a certain voltage to the first claw body 16a in order to perform the conduction judgment, i.e., judge as to whether or not the electric circuit 16 is electrically conductive.

At step S404, the robot controlling part 40 judges as to whether or not a conduction detection signal from the conduction detection unit 19 has been received. In the case where the result of the judgment at step S404 is "negative," the process proceeds to step S405. At step S405, the robot 30 continues the conveyance process in accordance with a conveyance operation command output from the robot controlling part 42, in order to convey the object 20 to an intended position.

On the other hand, in the case where the result of the judgment at step S404 is "positive," the process proceeds to step S406. When the electric circuit 17 is electrically conductive, it is indicated that the protective member 18 does not properly function and there is a risk of damaging the object 20. Therefore, at step S406, the alarm notification part 48 issues an alarm. The robot apparatus 3 may also be configured to automatically stop the robot 30 upon the notification of the alarm.

The gripping apparatus 10 and the robot apparatus 3 according to the present embodiment have the following advantages.

(1) The gripping apparatus 10 includes the electric circuit 17 which becomes electrically conductive when the object 20 is gripped by the claw 14 and the claw bodies 16a and 16b are in direct contact with the object 20. This allows the condition of the protective member 18 to be inspected based on the judgment as to whether or not the electrical circuit 17 is electrically conductive. Since there is no need for a special inspection apparatus or a skilled worker, the protective member 18 can be easily inspected.

(2) Since the conduction judgment can be performed any time as long as the object 20 is gripped, the malfunction of the protective member 18 can be discovered at an early stage. In addition, there is no need for scheduled inspection of the protective member, thereby increasing the efficiency of the operation.

(3) After the object 20 is gripped, the conduction judgment can be performed for a short period of time. This allows the protective member 18 to be inspected without affecting the conveyance process.

(4) Since the gripping apparatus 10 is attached to the wrist 32 of the robot 30, the gripping and conveyance processes can be performed within a wide movable range of the robot 30. Therefore, the gripping apparatus 10 can be used for various applications.

(5) When the electric circuit 17 is electrically conductive, an operator is notified of an alarm which indicates that the protective member 18 does not properly function. In this way, an operator can repair or exchange the protective member 18 without delay.

(6) Instead of the alarm notification, or in addition to the alarm notification, the robot 30 may also be automatically stopped. This prevents the gripping process or the conveyance process from being performed when the protective member 18 cannot provide reliable protection, thereby preventing the object 20 from being damaged.

Figure 5:
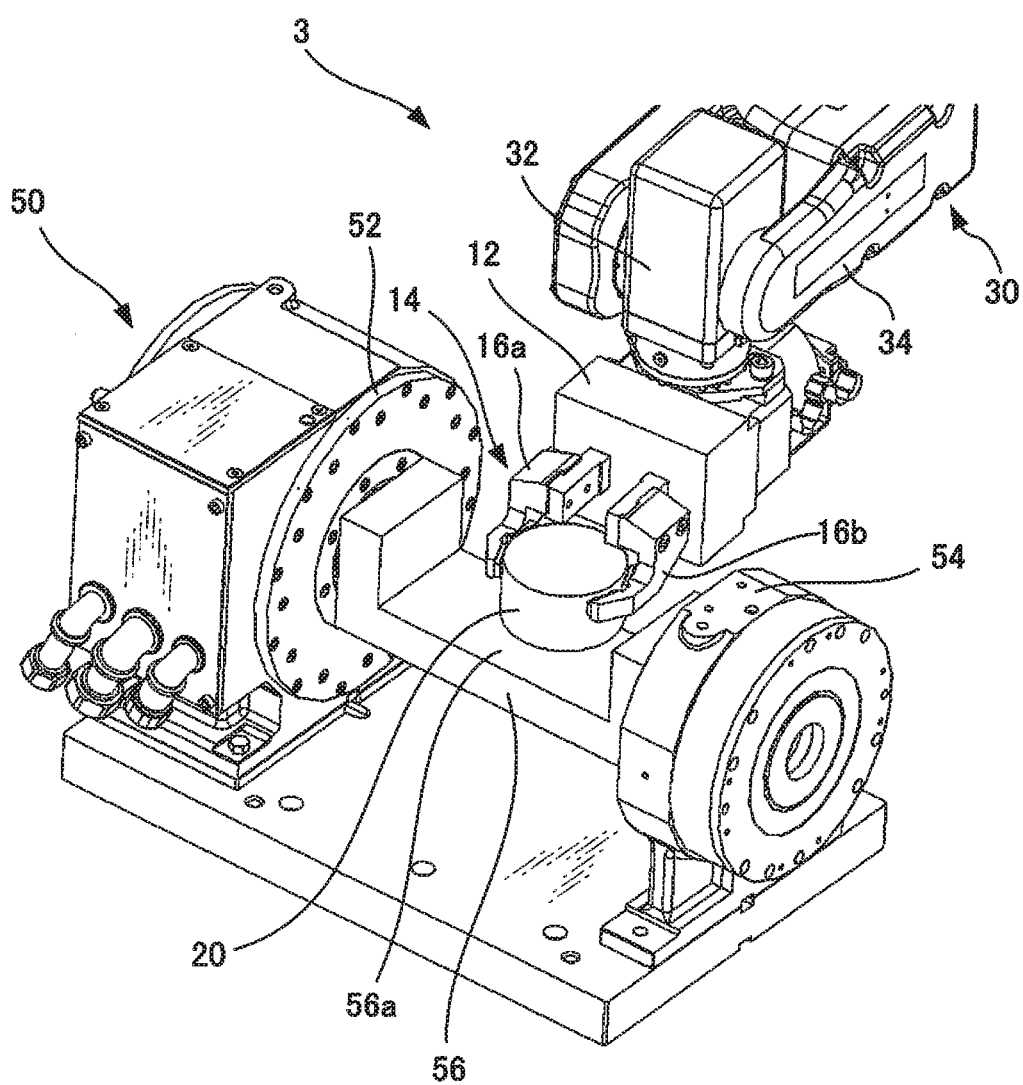
FIG. 5 is a perspective view illustrating a robot apparatus including a gripping apparatus according to another embodiment.

FIG. 5 is a perspective view illustrating a robot apparatus 3 including a gripping apparatus 10 according to another embodiment. The gripping apparatus 10 according to the present embodiment cooperates with a machine tool 50 to judge as to whether or not the protective member 18 properly functions. In the following explanation, matters which are different from the above-described embodiment will be mainly described.

The machine tool 50 includes a table 56, opposite ends of which are supported by a first support 52 and a second support 54, respectively. The table 56 has a mounting surface 56a on which the object 20 is mounted during a machining process. According to the present embodiment, the robot apparatus 3 is used to convey a processed object 20 from the table 56 to a target position.

The table 56 has electrically conductive properties to form an electric circuit together with the claw bodies 16a and 16b and the object 20. More specifically, a first electric circuit 17a and a second electric circuit 17b are formed, in which the first electric circuit 17a passes through the first claw body 16a, the object 20 and the table 56, and the second electric circuit 17b passes through the second claw body 16b, the object 20 and the table 56.

Figure 6:
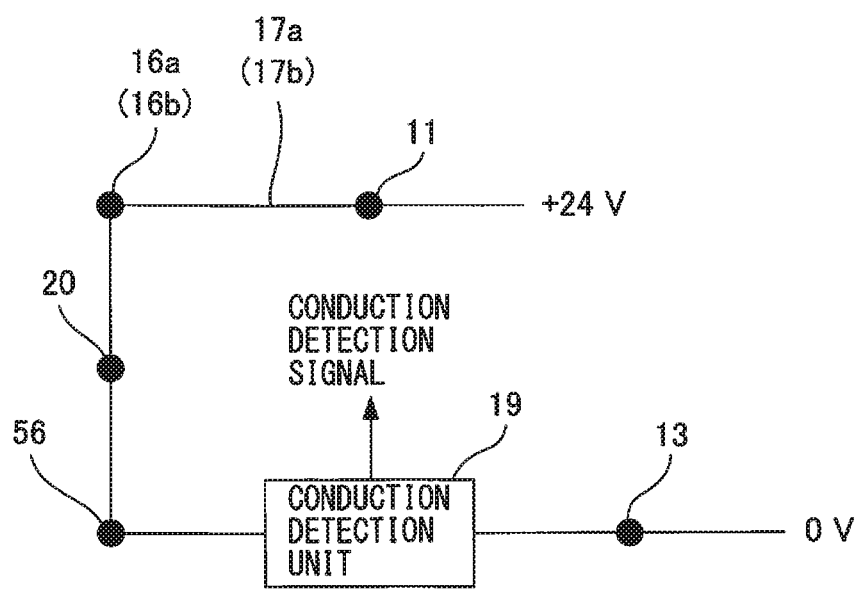
FIG. 6 shows an electric circuit passing through a claw and an object.

FIG. 6 shows an electric circuit passing through the first claw body 16a or the second claw body 16b, the object 20, and the table 56, or in other words, the first and second electric circuits 17a and 17b.

According to the present embodiment, the first and second claw bodies 16a and 16b are connected to a power source (not shown) through a first contact 11, such that a voltage is applied to the first and second claw bodies 16a and 16b independently of each other. On the other hand, the table 56 is connected to a second contact 13 to which a reference voltage is applied. The table 56 may also be grounded.

Similarly to the above-described embodiment, since the protective member 18 is attached to the claw bodies 16a and 16b, the respective electric circuits 17a and 17b are shut off by the protective member 18 and not become electrically conductive, as long as the protective member 18 properly functions. Accordingly, it can be judged as to whether or not the protective member 18 properly functions, by the conduction judgment part 46 (see FIG. 3) performing the conduction judgment.

When the protective member 18 attached to the first claw body 16a is inspected, a certain voltage (e.g., 24 V) is applied to the side of the first claw body 16a. Then, the conduction judgment part 46 of the robot control apparatus 40 judges as to whether or not the electric circuit 17 passing through the first claw body 16a, the object 20 and the table 56 is electrically conductive.

On the other hand, when the protective member 18 attached to the second claw body 16b is inspected, a certain voltage (e.g., 24 V) is applied to the side of the second claw body 16b. Then, the conduction judgment part 46 of the robot control apparatus 40 judges as to whether or not the electric circuit 17 passing through the second claw body 16b, the object 20 and the table 56 is electrically conductive.

As described above, by performing the conduction judgment using the table 56 of the machine tool 50, it can be judged as to whether or not there is a risk of damaging the object 20 prior to the conveyance of the processed object 20. This prevents the object 20 from being damaged, and therefore the yield rate can be improved.

Instead of the table 56 of the machine tool 50, any support on which the object 20 can be mounted may also be used. In such a case, an electric circuit is formed so as to pass through the first claw body 16a or the second claw body 16b, the object 20, and the support.

The gripping apparatus of the present invention may also be attached to other types of movable apparatus having a known configuration, such as a linear motor, instead of the robot.

When the gripping apparatus is configured to grip an object formed with a hole, the gripping apparatus may also be configured to grip the object on a wall of the object with the claw bodies inserted into the hole of the object. More specifically, the claw bodies which are provided within the hole are driven in an opening direction to bring the claw bodies into contact with the wall of the hole. In this case, a protective member is provided on outer surfaces of the claw bodies, rather than inner surfaces of the claw bodies facing each other.

Effect of the Invention

The gripping apparatus according to the present invention includes an electric circuit which becomes electrically conductive when the claw and the object are in direct contact with each other. Accordingly, the condition of the protective member can be inspected based on the judgment as to whether or not the electric circuit is electrically conductive. The conduction judgment can be performed at any time as long as the object is gripped, and therefore malfunction of the protective member can be discovered at an early stage. In addition, scheduled inspection of the protective member is no longer necessary, and thus the efficiency of the operation can be improved.

According to a robot apparatus including the gripping apparatus of the present invention, the gripping apparatus can be moved over a wide range. Therefore, the gripping apparatus can be used for various applications.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

The invention claimed is:

1. A gripping apparatus, comprising:
   a claw configured to releasably grip an object; and
   a protective member configured to protect the object, the protective member being attached to the claw, such that when the object is gripped by the claw, the protective member is provided between the claw and the object,
   wherein the protective member is an electrical insulator,
   wherein the gripping apparatus further comprises:
      an electric circuit configured to pass through the claw and the object when the object is gripped by the claw; and
      a conduction judgment part configured to judge as to whether or not the electric circuit is electrically conductive, and
   wherein the electric circuit is configured to become electrically conductive when the protective member is worn out or impaired and causes the claw and the object to come into direct contact with each other.

2. The gripping apparatus according to claim 1, wherein the electric circuit also passes through a support on which the object is mounted.

3. The gripping apparatus according to claim 2, wherein the object is a processed article processed by a machine tool, and wherein the support is a table of the machine tool, on which the processed article is mounted.

4. The gripping apparatus according to claim 3, wherein the claw comprises a first claw body and a second claw body, and
   the electric circuit comprises
      a first electric circuit which is configured to pass through the first claw body, the object and the table, and
      a second electric circuit which is configured to pass through the second claw body, the object and the table.

5. The gripping apparatus according to claim 4, wherein the first claw body and the second claw body are connected to a power source such that a voltage is applied to the first claw body and the second claw body independently of each other, and
   the table is connected to a contact to which a reference voltage is applied.

6. A robot apparatus, comprising:
   a multiple-joint robot; and the gripping apparatus according to claim 1, the gripping apparatus being attached to an arm of the multiple-joint robot.

7. The robot apparatus according to claim 6, further comprising a control apparatus configured to control the multiple-joint robot, wherein the control apparatus comprises the conduction judgment part.

8. The robot apparatus according to claim 7, wherein the control apparatus is configured to automatically stop the multiple-joint robot when it is judged that the electric circuit is electrically conductive.

9. The gripping apparatus according to claim 1, wherein the claw comprises a first claw body and a second claw body, and the protective member is provided on a surface of at least one of the first claw body and the second claw body to be interposed between said at least one of the first claw body and the second claw body and the object when the object is gripped by the claw.

10. The gripping apparatus according to claim 9, wherein the first claw body and the second claw body are insulated from each other on a side of a base of the gripping apparatus.

11. The gripping apparatus according to claim 9, wherein the protective member is made of a material having an electrical resistance greater than those of the first claw body, the second claw body, and the object.

12. The gripping apparatus according to claim 9, wherein at least one of the first claw body and the second claw body is connected to a power source, and the power source is incorporated into the claw.

* * * * *